(12) United States Patent
Bush et al.

(10) Patent No.: US 12,055,664 B2
(45) Date of Patent: Aug. 6, 2024

(54) DUAL PHOTODIODE LIGHT DETECTION AND RANGING

(71) Applicant: Luminar Technologies, Inc., Orlando, FL (US)

(72) Inventors: Adam R. Bush, Shakopee, MN (US); Kevin A. Gomez, Eden Prairie, MN (US)

(73) Assignee: Luminar Technologies, Inc., Orlando, FL (US)

( * ) Notice: Subject to any disclaimer, the term of this patent is extended or adjusted under 35 U.S.C. 154(b) by 864 days.

(21) Appl. No.: 17/067,358

(22) Filed: Oct. 9, 2020

(65) Prior Publication Data

US 2022/0113388 A1    Apr. 14, 2022

(51) Int. Cl.
| | |
|---|---|
| *G01S 7/4861* | (2020.01) |
| *G01S 7/481* | (2006.01) |
| *G01S 7/497* | (2006.01) |
| *G01S 17/931* | (2020.01) |

(52) U.S. Cl.
CPC .......... *G01S 7/4861* (2013.01); *G01S 7/4811* (2013.01); *G01S 7/497* (2013.01); *G01S 17/931* (2020.01)

(58) Field of Classification Search
CPC ...... G01S 7/497; G01S 7/4811; G01S 17/931; G01S 7/4876; G01S 7/4913; G01S 7/493; G01S 17/42; G01S 17/10; G01S 7/486
USPC ........................................................ 356/4.01
See application file for complete search history.

(56) References Cited

U.S. PATENT DOCUMENTS

| | | |
|---|---|---|
| 9,945,937 B2 | 4/2018 | Du et al. |
| 10,330,777 B2 | 6/2019 | Popovich et al. |
| 10,422,880 B2 | 9/2019 | Crouch et al. |
| 2019/0250256 A1 | 8/2019 | Gunnam et al. |

*Primary Examiner* — Daniel L Murphy (57) ABSTRACT

LiDAR optical paths, particularly in co-located emitter/receiver path configurations, can introduce unintended and unwanted reflections due to mirrors, lenses, and/or enclosure materials or glass that can fall on one or more photosensors. These un-desirable signals can cause significant disruptions in output amplifier biasing and/or severe channel saturation. Autonomous vehicle LiDAR is particularly challenging as packaging requirements require complex optics to direct the laser source; the target size, shape, and relative velocity, and distance to the autonomous vehicle are unknown; and the location of the target objects within range are potentially rapidly changing over time. The presently disclosed dual photodiode LiDAR systems are used to separate and compensate for errors introduced by LiDAR optics to improve the accuracy and reliability of LiDAR systems, including but not limited to autonomous vehicle LiDAR systems.

20 Claims, 6 Drawing Sheets

DUAL PHOTODIODE LIGHT DETECTION AND RANGING

BACKGROUND

Light detection and ranging (also referred to as laser imaging, detection, and ranging; LiDAR; LIDAR; Lidar; or LADAR) is a method for measuring distances (also referred to as ranging) by illuminating a target with a laser source and measuring a reflection of the laser light with a sensor. Laser return times and differences in phase and/or wavelengths can then be used to estimate a distance between the target and the laser source. Lidar has terrestrial, airborne, and mobile applications.

One application of LiDAR is ranging and detection of objects for control and navigation of autonomous vehicles (e.g., cars, trucks, watercraft, aircraft, and spacecraft). Autonomous vehicle LiDAR is particularly challenging as autonomous vehicle packaging requirements require complex optics to direct the laser source of the LiDAR system. Further, the target size, shape, and relative velocity, and distance to the autonomous vehicle are unknown to the autonomous vehicle LiDAR system. Still further, the location of the target objects within range of the autonomous vehicle LiDAR system are potentially rapidly changing over time. Accordingly, the presently disclosed technology functions to extend the dynamic range of prior art LiDAR systems. Further, errors or interference introduced by the LiDAR optics that have not previously been addressed as a separate contributor of error in prior art LiDAR systems are addressed specifically herein.

SUMMARY

Implementations described and claimed herein address the foregoing problems by providing a dual photodiode Lidar system comprising a light source to direct a distance-measuring beam of light on a target, a primary photodiode to receive a reflection of the beam of light from the target, a secondary photodiode to receive a balancing signal to account for an optics error, and a timing circuit to determine a distance between the light source and the target based on a combined output of the primary photodiode and the secondary photodiode.

Implementations described and claimed herein further address the foregoing problems by further providing a method of operating a dual photodiode Lidar system. The method comprises directing from a light source a distance-measuring beam of light on a target, receiving a reflection of the beam of light from the target on a primary photodiode, receiving a balancing signal to account for an optics error on a secondary photodiode, and determining a distance between the light source and the target based on a combined output of the primary photodiode and the secondary photodiode using a timing circuit.

Implementations described and claimed herein still further address the foregoing problems by still further providing a dual photodiode Lidar system. The system comprises a light source to direct a distance-measuring beam of light on a target, a primary photodiode to receive a reflection of the beam of light from the target, a secondary photodiode to receive a balancing signal to account for an optics error, and a set of optics to direct the beam of light from the light source to the target and direct the reflection of the beam of light from the target. The optics error is caused by one or more of erroneous reflection and refraction from the set of optics. The system further comprises a transimpedance amplifier, wherein an output of the primary photodiode and an input to the secondary photodiode are both connected to a current input of the transimpedance amplifier at a common node. The system still further comprises a timing circuit to determine a distance between the light source and the target based on a voltage output from the transimpedance amplifier corresponding to the current input of the transimpedance amplifier at the common node.

Other implementations are also described and recited herein.

DETAILED DESCRIPTION

LiDAR optical paths, particularly in co-located emitter/receiver path configurations, can introduce unintended and unwanted reflections due to mirrors, lenses, and/or enclosure materials or glass that can fall on one or more photosensors. These un-desirable signals can cause significant disruptions in output amplifier biasing and/or severe channel saturation because the light received by the one or more photosensors may include both light reflected from a target and light that hasn't traveled beyond the LiDAR system. Autonomous vehicle LiDAR systems have unique constraints, some or all of which may not be present in other LiDAR systems. The presently disclosed dual photodiode LiDAR systems are used to separate and compensate for errors introduced by LiDAR optics to improve the accuracy and reliability of LiDAR systems, including but not limited to autonomous vehicle LiDAR systems.

Figure 1:
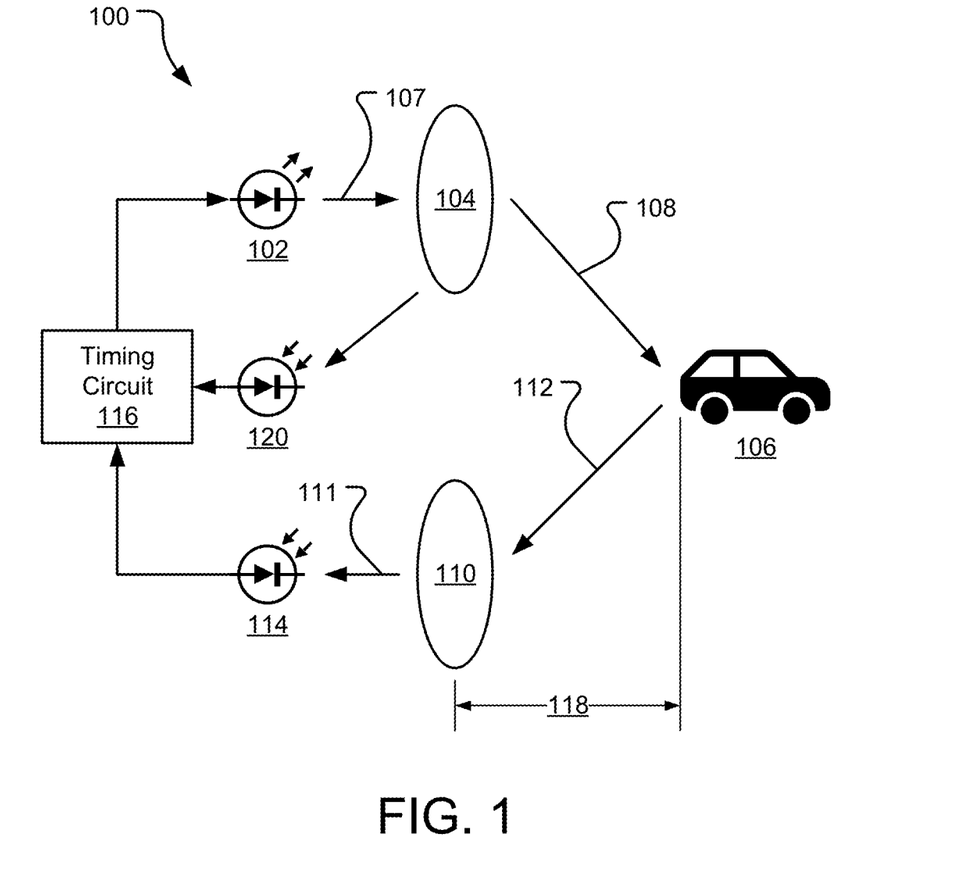
FIG. 1 illustrates an example dual photodiode LiDAR system.

FIG. 1 illustrates an example dual photodiode LiDAR system 100 used in conjunction with an autonomous car, for example. The system 100 includes a light source 102 (e.g., a laser diode or light-emitting diode (LED)) that emits a beam of light (e.g., infrared light, illustrated as arrows 107, 108) through emitter optics 104 to direct and focus the light on a target 106 (here, illustrated as an automobile). A portion of the beam of light is reflected from the target 106 and returned to the system 100 at detector optics 110, as illustrated by arrows 111, 112. The detector optics 110 collect and focus the reflected light on primary photosensor 114 (e.g., an avalanche photodiode (APD), a multi-pixel photon counter (MPPC), or a PIN photodiode). Both the light source 102 and the photosensor 114 are connected to a timing circuit 116 (e.g., a time to digital converter (TDC)), which calculates return times (also referred to as time of flight or ToF) for the beam of light and compares differences in phase of the emitted light and the returned light to measure distance 118 to the target 106.

ToF may be measured using a direct or indirect detection scheme. In an example direct ToF detection scheme, the light source 102 emits short pulses of light (e.g., several nanoseconds long) and the timing circuit 116 measures the time until each pulse returns to the photosensor 114 to measure the distance 118 to the target 106. In an example indirect ToF detection scheme, the light source 102 emits a continuous wave of modulated light. The photosensor 114 detects any reflected light from the target 106, and the timing and phase of the reflected light (and in some implementations, differences in wavelength) are used to calculate the distance 118 to the target 106.

Using the direct detection scheme, the system 100 may fire rapid pulses of light, with a rate in excess of 100 kHz. Using the indirect detection scheme, the LiDAR system 100 may enhance timing resolution by matching the phase of the reflection with the phase of the source waveform. Regardless of which detection scheme (or both detection schemes) the system 100 utilizes, precise measurement of the reflection timing (and phase) with the needed accuracy and resolution, particularly for autonomous vehicles, is difficult.

Autonomous vehicle LiDAR is particularly challenging as the target 106 size, shape, and relative velocity, and distance to the autonomous vehicle are unknown. As a result, the calibration of the system 100 may need to accurately detect both small and large target objects at a variety of distances from the light source 102 (e.g., 1-250 meters), which results in a relatively wide range of output currents from the photosensor 114 (e.g., from 10 nanoamps to 100 milliamps). Further, the location of target objects (e.g., target 106) within range of the system 100 may be potentially rapidly changing over time (e.g., due to a relative velocity of the target 106 with reference to the autonomous vehicle, caused by the autonomous vehicle's velocity, the target's velocity, or a combination thereof). Accordingly, the system 100 may require a relatively high sampling rate (e.g., greater than 20 samples/second) and detection accuracy to prevent undetected targets from impacting the autonomous vehicle, or vice versa, potentially causing damage to the autonomous vehicle and/or the target 106, or injury or death to occupant(s) of the autonomous vehicle and/or the target 106.

In various implementations, the emitter optics 104 and the detector optics 110 include an array of mirrors, lenses, and/or filters, any or all of which may cause unwanted reflection or refraction of light within the system 100. Dirt or other contaminants present on various surfaces of the optics 104, 110, damage done to the various surfaces of the optics 104, 110 (e.g., scratches), and/or manufacturing defects within the optics 104, 110 may increase the magnitude of unwanted reflection or refraction of light, however, some unwanted reflection or refraction of light may be present without any particular contaminants, damage, or defects present on or within the optics 104, 110. A portion of the unwanted reflection or refraction of light may reach the primary photosensor 114, thus skewing calculation of the distance 118 to the target 106. The unwanted reflection or refraction of light within the system 100 that yields the skewed calculation of the distance 118 to the target 106 is referred to herein as an optics error.

In an effort to maximize detection accuracy and precision of the system 100, a secondary photosensor 120 (e.g., an APD, MPPC, or PIN photodiode) is utilized by the system 100 to detect the optics error and cancel the reflection and/or refraction errors from the light directed on the primary photosensor 114. The timing circuit 116 utilizes outputs from both photosensors 114, 120 and compares those outputs to the light generated by the light source 102 to calculate an optics error compensated distance 118 to the target 106.

The system 100 may also be used to make a digital 3-D representation of the target 106 by scanning an area and using the resulting array of calculated distances to the target 106 to map the target 106. Various applications of the ranging and 3-D representations created by the dual photodiode LiDAR disclosed herein include surveying, geodesy, geomatics, archaeology, geography, geology, geomorphology, seismology, forestry, atmospheric physics, laser guidance, airborne laser swath mapping (ALSM), and laser altimetry.

Figure 2:
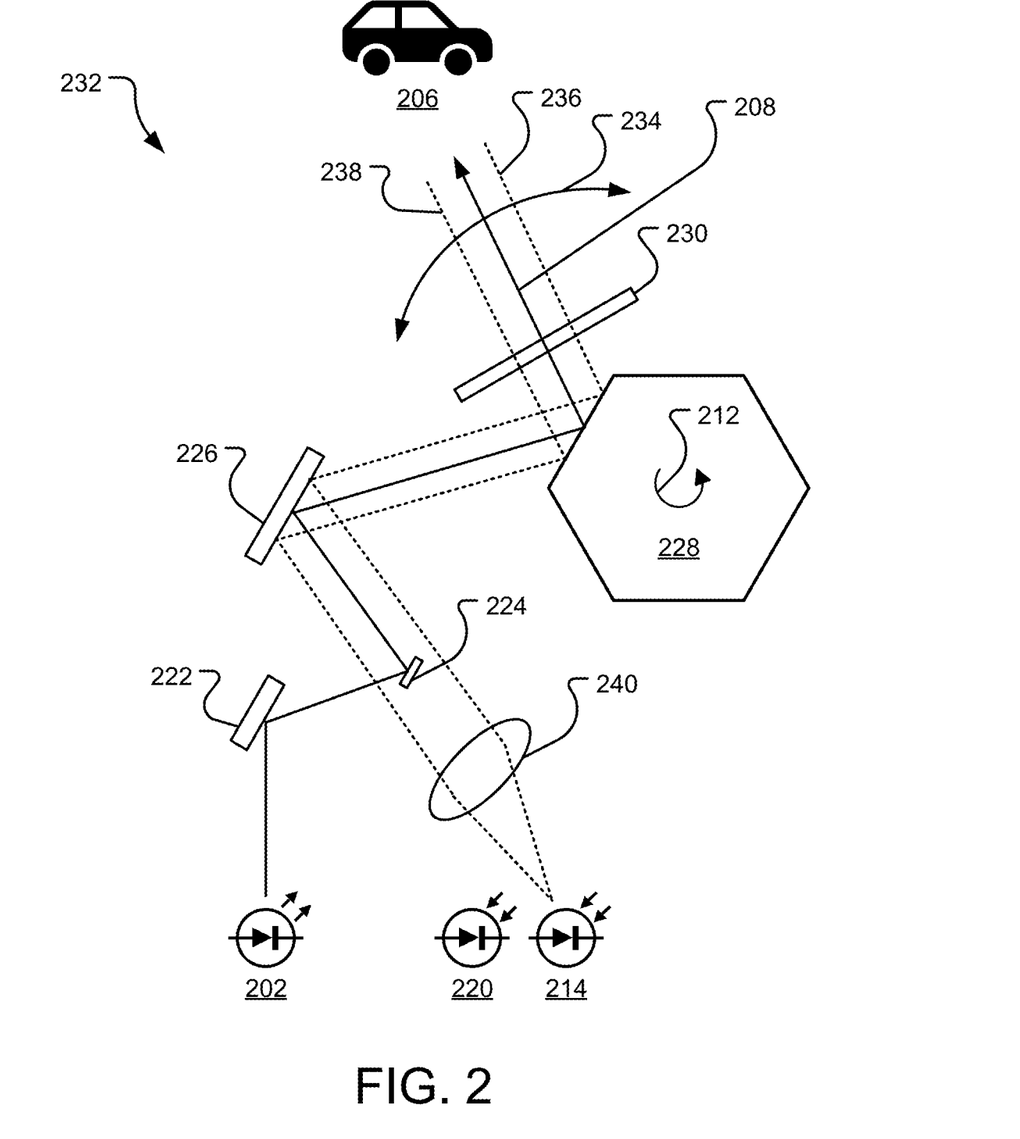
FIG. 2 illustrates an example optics assembly for a dual photodiode LiDAR system.

FIG. 2 illustrates an example optics assembly 232 for a dual photodiode LiDAR system. Light source 202 emits an outbound beam of light illustrated as solid arrow 208 to a pair of turning mirrors 222, 224 that in turn direct the beam of light to a galvo mirror 226 at a desired angle. The beam of light is reflected from the galvo mirror 226 to a polygonal mirror 228, which directs the light through window 230, which is a protective glass or plastic barrier, and out of the optics assembly 232.

During operation, the galvo mirror 226 oscillates up and down and the polygonal mirror 228 rotates (as illustrated by arrow 212) to provide a scanned field of view outward from the optics assembly 232 both vertically (e.g., +/−10 degrees from horizontal, 20 degrees of total range) and horizontally (e.g., 60 degrees of range). As the optics assembly 232 is depicted in plan view, the vertical oscillation of the galvo mirror 226 and resulting vertical range of detection of the optics assembly 232 is not illustrated, while the rotation of the polygonal mirror 228 as illustrated by the arrow 212 yields the resulting horizontal range of detection illustrated by arrow 234.

Target 206 (here, illustrated as an automobile) is present within the scanned field of view and range of the optics assembly 232. A portion of the beam of light is reflected from the target 206 and returned inbound to the optics assembly 232, as illustrated by dotted lines 236, 238, which define the bounds of the reflected light detectable by the optics assembly 232. Specifically, the inbound light enters the optics assembly 232 through the window 230 and is directed to the polygonal mirror 228. The inbound light reflects from the polygonal mirror 228 to the galvo mirror 226, following a similar path as the outbound beam of light. The inbound light is directed to a collection lens 240, which focuses the inbound light on primary photosensor 214. While not shown, the inbound light may also reflect from one or more turning mirrors to direct the inbound light and distribute the inbound light on the collection lens 240. Both the light source 202 and the primary photosensor 214 are connected to a timing circuit (not shown, see e.g., timing circuit 116 of FIG. 1) that calculates return times (also referred to as time of flight or ToF) for the beam of light and compares differences in phase of the outbound beam of light and the inbound light to measure a distance to the target 206.

Using repeated distance measurements within the scanned field of view, the dual photodiode LiDAR system may build a complex map (also, point cloud) of the scanned field of view, including surfaces of the target 206. More specifically, an array of raw distance measurements may be converted using a LiDAR image processor to create a 3D point cloud based on the array of raw distance measurements. This may be accomplished by directing the outbound beam of light in a scan pattern, using the detected reflections and corresponding distance measurements to create an image which captures the scanned field of view, including but not limited to the target 206 with detail, depth, and clarity.

The point cloud can then be further processed by the LiDAR image processor to provide a detailed sense of the scanned field of view, including shapes and distances to various targets (e.g., target 206), each of which may be changing over time. This may result in a successive series of point clouds that may be used in conjunction with a known position, speed, and direction of the LiDAR system to identify objects and their relative motion vectors and predict and avoid collisions between the LiDAR system and any identified targets.

The optics assembly 232 as contemplated herein includes one or both of emitter optics and detector optics, some components of which may be shared between the emitter optics and detector optics, as illustrated in FIG. 2. For example, the emitter optics include the turning mirrors 222, 224, the galvo mirror 226, the polygonal mirror 228, and the window 230, while the detector optics include the galvo mirror 226, the polygonal mirror 228, the window 230, and the collection lens 240. Accordingly, the entire optics assembly 232 includes the turning mirrors 222, 224, the galvo mirror 226, the polygonal mirror 228, the window 230, and the collection lens 240. Further implementations may include additional optical components (e.g., mirrors, filters, and lenses) within one or both of the emitter optics and the detector optics.

Any or all of the mirrors, lenses, and/or filters of the optics assembly 232, including both those explicitly shown and described and other components of the optics assembly 232 not explicitly shown and described may cause unwanted reflection or refraction of light within the optics assembly 232. Dirt or other contaminants present on various surfaces of the optics assembly 232, damage done to the various surfaces of the optics assembly 232, and/or manufacturing defects within the optics assembly 232 may increase the magnitude of unwanted reflection or refraction of light, however, some unwanted reflection or refraction of light may be present without any particular contaminants, damage, or defects present on or within the optics assembly 232. A portion of the unwanted reflection or refraction of light may reach the primary photosensor 214, thus skewing calculation of the distance to the target 206. The unwanted reflection or refraction of light within the optics assembly 232 that yields the skewed calculation of the distance to the target 206 is referred to herein as an optics error.

In an effort to maximize detection accuracy and precision of the optics assembly 232, a secondary photosensor 220 is utilized by the optics assembly 232 to detect the optics error and cancel the reflection and/or refraction errors from the light directed on the primary photosensor 214. The timing circuit utilizes outputs from both photosensors 214, 220 and compares those outputs to the light generated by the light source 202 to calculate an optics error compensated distance to the target 206, and successively map the target 206 with repeated optics error compensated measurements.

While a single channel dual photodiode LiDAR system is described and an associated optics assembly 232 is depicted in FIG. 2, other implementations may include additional channels with similar corresponding light source(s), emitter optics, detector optics, and photosensor(s). Some components may be shared between multiple channels (e.g., the polygonal mirror 228 may be shared between a two-channel dual photodiode LiDAR system).

Figure 3:
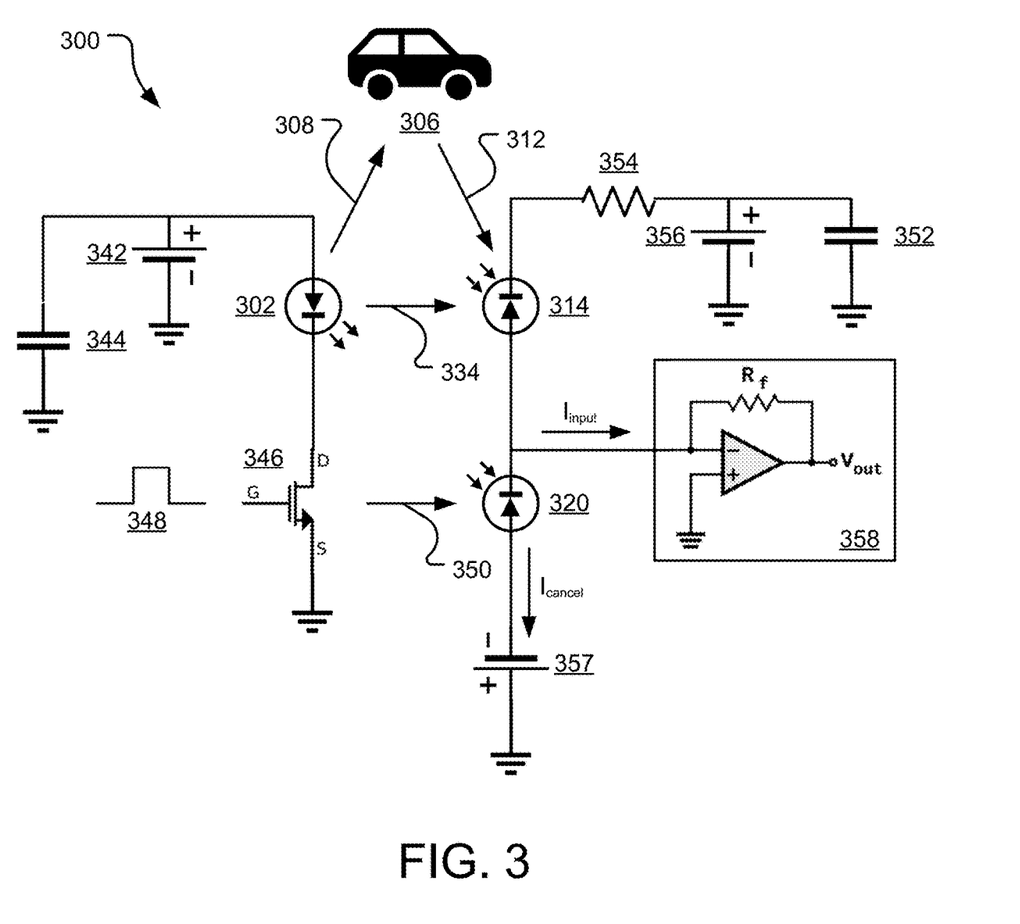
FIG. 3 illustrates an example dual photodiode LiDAR circuit diagram.

FIG. 3 illustrates an example dual photodiode LiDAR circuit diagram 300. Light source 302 is connected to a power supply 342 with a low impedance energy storage device (or capacitor) 344 connected in parallel near the light source 302 for supplying energy for a ToF pulse. The light source 302 is further connected to an n-type MOSFET 346 that receives a signal 348 from a timing circuit (not shown, see e.g., timing circuit 116 of FIG. 1) to fire the light source 302 at a predetermined frequency and pulse width. The light source 302 emits a beam of light through emitter optics (not shown, see e.g., a subset of optics 232 of FIG. 2) that direct and focus the light on a target 306 (here, illustrated as an automobile), as illustrated by arrow 308. A portion of the beam of light is reflected from the target 306 and returned through detector optics (not shown, see e.g., another subset of optics 232 of FIG. 2) to a primary photosensor 314, as illustrated by arrow 312.

Various components of the emitter optics and/or the detector optics may cause unwanted reflection or refraction of light emitted from the light source 302. A portion of the unwanted reflection or refraction of light may reach the primary photosensor 314, as illustrated by arrow 334, thus adding error due to an unwanted signal to a calculation of a distance to the target 306 or altering analog bias points. The unwanted reflection or refraction of light that yields the skewed calculation of the distance to the target 306 is referred to herein as an optics error.

A secondary photosensor 320 also receives the unwanted reflection or refraction of light (or a separate dedicated feed approximating the unwanted reflection or refraction of light, also referred to as a balancing signal or feed), as illustrated by arrow 350. In various implementations, the balancing signal from the light source 302 may be transmitted over a dedicated path (e.g., a series of mirrors or a fiber cable running from the light source 302 to the secondary photosensor 320). The dedicated path may be chosen to have a length equivalent to the internal timing of the unwanted reflection or refraction of light that is directed on the primary photosensor 314. In other implementations, the balancing signal may be a diffuse reflection from a window (e.g., window 230 of FIG. 2). The balancing signal may be used to cancel the optics error created by the unwanted reflected and/or refracted light directed on the primary photosensor 314.

The balancing signal functions to extend the dynamic range of the primary sensor path (illustrated by arrow 334) and allow the primary path to function without the noise caused by the unwanted reflected and/or refracted light (illustrated by arrow 350). Further, saturation of the transimpedance amplifier (TIA) 358, discussed in detail below, results in a finite period of 'blindness' while it recovers. The balancing signal eliminates or reduces the blindness period. Further, there is some improvement in accuracy of the primary sensor path using the balance signal. "Optics error" as used herein may be considered as one or both of an error and interference to the primary path.

In various implementations, the photosensors 314, 320 are separate devices that are sufficiently physically separately located within the system 300 to distinguish light directed upon one of the photosensors 314, 320 from light directed upon another of the photosensors 314, 320. In implementations where the photosensors 314, 320 are insufficiently physically separated (e.g., the photosensors 314, 320 are placed in close proximity to one another), an optical barrier or other occlusion may be placed between the photosensors 314, 320. In still further implementations, the photosensors 314, 320 may be manufactured on a common die (e.g., a three-terminal dual photodiode). One side of the three-terminal dual photodiode could be occluded and fed the balancing signal separately (e.g., by coupling a fiber into one of the photodiodes). Further, the photodiodes may be oriented facing different directions (e.g., the primary photodiode may face up, while the secondary photodiodes may face to the side) in the three-terminal dual photodiode to aid in light separation. Regardless of implementation, optical cancellation of light between the photosensors 314, 320 is minimized so that the circuit diagram 300 can electrically cancel the light, as shown and described.

Both the photosensors 314, 320 are connected to a bias circuit including a power supply 356, capacitor 352, and resistor 354 to set a high reverse bias voltage for the photosensors 314, 320. An output of the primary photosensor 314 is input to the TIA 358 to convert and amplify the input current ($I_{input}$) into a voltage ($V_{out}$) useable by a timing circuit to calculate a distance to the target 306. The input to the TIA 358 is further connected to the secondary photosensor 320, which permits a portion of the current from the primary photosensor 314 to flow through the secondary photosensor 320 (referred to herein as cancellation current ($I_{cancel}$)) rather than into the TIA 358. The secondary photosensor 320 may flow through another power supply 357 to ground, which provides a negative bias for the cancellation current ($I_{cancel}$). This proportionally reduces the input current ($I_{input}$) based on the magnitude of the optics error.

The dual photodiode LiDAR is particularly sensitive to input capacitance. The dual photodiode LiDAR circuit diagram 300 illustrates both photosensors 314, 320 utilizing a common node as an input to the TIA 358. The subtractive effect of the cancellation current ($I_{cancel}$) on the overall magnitude of input current ($I_{input}$) may prevent or reduce the occurrence or likelihood of occurrence of the TIA 358 going to saturation. Saturation may be caused by a particularly large optics error that would otherwise (without the presence of the secondary photosensor 320) cause the input current ($I_{input}$) to exceed a closed-loop current-handling capacity of the TIA 358. Saturation of the TIA 358 takes time to recover, meanwhile distance measurements to the target 306 may not be made.

In various implementations, one or more of the bias and gain at one or more of the primary photosensor 314, secondary photosensor 320, and the TIA 358 may be calibrated to achieve the desired optics error cancellation effect. Further, the intensity of the light (or gain) and/or the phase of the light entering the secondary photosensor 320 may either be adjusted manually or electronically to match that of light directed on the primary photodiode 320 due to the optics error. For example, manual adjustment of the secondary photosensor 320 may include one or more of moving the secondary photosensor 320 or changing its orientation with reference to incoming light. Manual adjustment of the secondary photosensor 320 may also include manipulation of one or more mirrors defining the light path to the secondary photosensor 320 or changing the length and/or position of the fiber that carries light to the secondary photosensor 320. Further, the manual or electronic adjustment of the gain and/or the phase of the light entering the secondary photosensor 320 may be accomplished actively or adaptively through an alignment operation. Still further, the amplitude and phase delay on the input current ($I_{input}$) and the cancellation current ($I_{cancel}$) may need to be calibrated to match properly. Such calibration and alignment operations may be iteratively performed at the point of manufacture or in the field until the desired optics error cancellation effect is achieved. In other implementations, the optics error is known, and the bias and gain are preset based on the known optics error.

Figure 4:
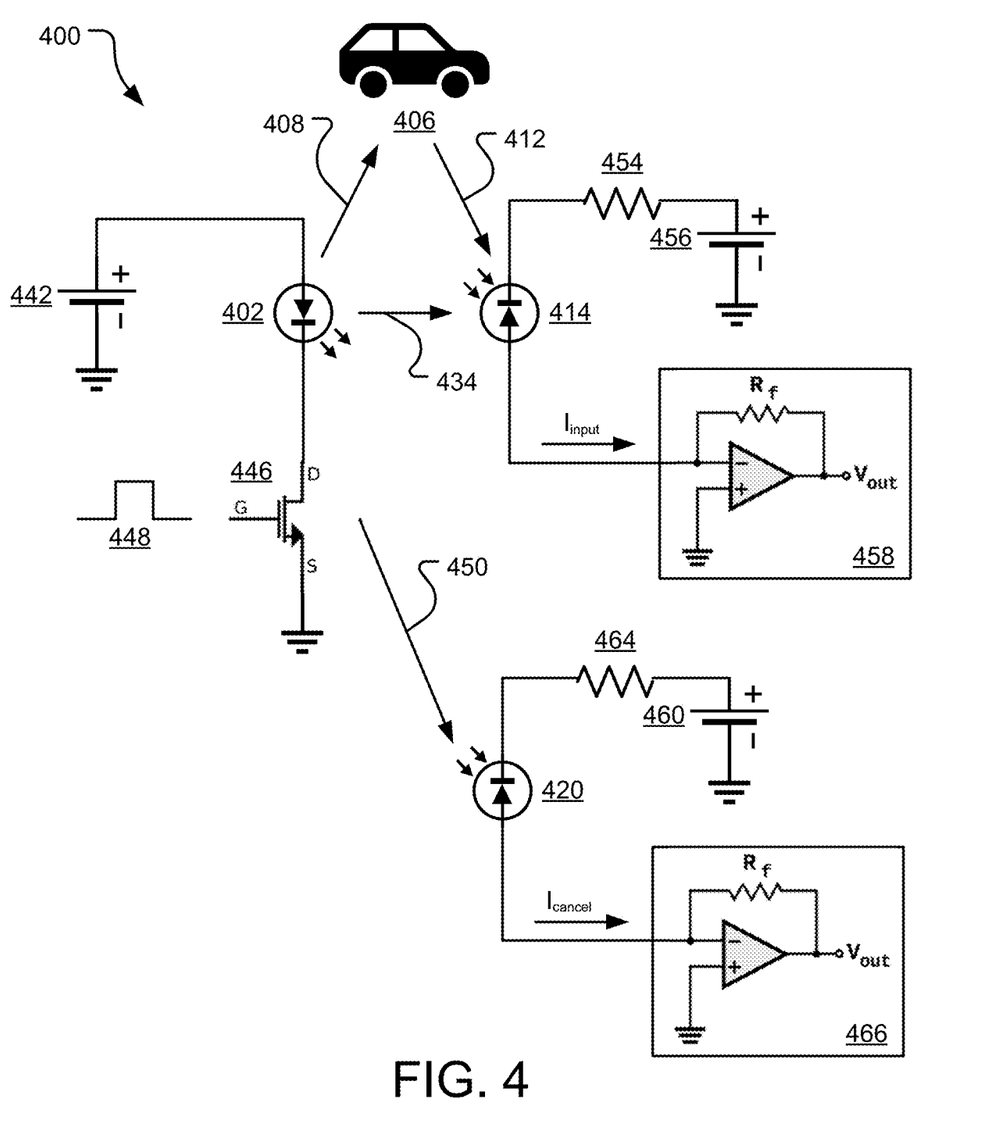
FIG. 4 illustrates another example dual photodiode LiDAR circuit diagram.

FIG. 4 illustrates another example dual photodiode LiDAR circuit diagram 400. Light source 402 is connected to a power supply 442 and an n-type MOSFET 446 that receives a signal 448 from a timing circuit (not shown, see e.g., timing circuit 116 of FIG. 1) to fire the light source 402 at a predetermined frequency and pulse width. Other systems and methods for ToF pulse generation beyond the depicted and described n-type MOSFET 446 are contemplated herein, for example, a Q-switched laser source. The light source 402 emits a beam of light through emitter optics (not shown, see e.g., a subset of optics 232 of FIG. 2) that direct and focus the light on a target 406, as illustrated by arrow 408. A portion of the beam of light is reflected from the target 406 and returned through detector optics (not shown, see e.g., another subset of optics 232 of FIG. 2) to a primary photosensor 414, as illustrated by arrow 412.

Various components of the emitter optics and/or the detector optics may cause unwanted reflection or refraction of light emitted from the light source 402. A portion of the unwanted reflection or refraction of light may reach the primary photosensor 414, as illustrated by arrow 434, thus adding error due to unwanted signal to a calculation of a distance to the target 406 or altering analog bias points. The unwanted reflection or refraction of light that yields the skewed calculation of the distance to the target 406 is referred to herein as an optics error.

A secondary photosensor 420 also receives the unwanted reflection or refraction of light (or a separate dedicated feed approximating the unwanted reflection or refraction of light, also referred to as a balancing signal or feed), as illustrated by arrow 450. In various implementations, the balancing signal from the light source 402 may be transmitted over a dedicated path. In other implementations, the balancing signal may be a diffuse reflection from a window (e.g., window 230 of FIG. 2). The balancing signal may be used to cancel the optics error created by the unwanted reflected and/or refracted light directed on the primary photosensor 414.

The primary photosensor 414 is connected to a bias circuit including a power supply 456 and resistor 454 to set a high reverse bias voltage for the photosensor 414. An output of the primary photosensor 414 is input to a TIA 458 to convert and amplify the input current ($I_{input}$) into a voltage ($V_{out}$) useable by a timing circuit to calculate a distance to the target 406. The secondary photosensor 420 is connected to a separate bias circuit including a power supply 460 and resistor 464 to set a high reverse bias voltage for the photosensor 420. An output of the secondary photosensor 420 is input to a TIA 466 to convert and amplify the input current ($I_{cancel}$) into a voltage ($V_{out}$) useable by the timing circuit to cancel an optics error created by the unwanted reflected and/or refracted light directed on the primary photosensor 414.

The timing circuit may include a difference circuit that receives voltage outputs ($V_{out}$) from both the TIAs 458, 466 and offsets the voltage output from the TIA 458 using the voltage output from the TIA 466 to cancel the optics error created by the unwanted reflected and/or refracted light directed on the primary photosensor 414. The circuit diagram 400 of FIG. 4 has separate inputs to separate TIAs 458, 466, which may yield an overall increase of capacitance as compared to circuit diagram 300. For both circuit diagrams 300, 400, additional capacitance may be accounted for by the timing circuit, or other mechanism.

In various implementations, one or more of the bias and gain at one or more of the primary photosensor 414, secondary photosensor 420, and the TIA 458 may be calibrated to achieve the desired optics error cancellation effect. Further, the intensity of the light (or gain) and/or the phase of the light entering the secondary photosensor 420 may either be adjusted manually or electronically to match that of light directed on the primary photodiode 420 due to the optics error. For example, manual adjustment of the secondary photosensor 420 may include one or more of moving the secondary photosensor 420 or changing its orientation with reference to incoming light. Manual adjustment of the secondary photosensor 420 may also include manipulation of one or more mirrors defining the light path to the secondary photosensor 420 or changing the length of the fiber that carries light to the secondary photosensor 420. Further, the manual or electronic adjustment of the gain and/or the phase of the light entering the secondary photosensor 420 may be accomplished actively or adaptively through an alignment operation. Still further, the amplitude and phase delay on the input current ($I_{input}$) and the cancellation current ($I_{cancel}$) may need to be calibrated to match properly. Such calibration and alignment operations may be iteratively performed at the point of manufacture or in the field until the desired optics error cancellation effect is achieved. In other implementations, the optics error is known, and the bias and gain are preset based on the known optics error.

Figure 5:
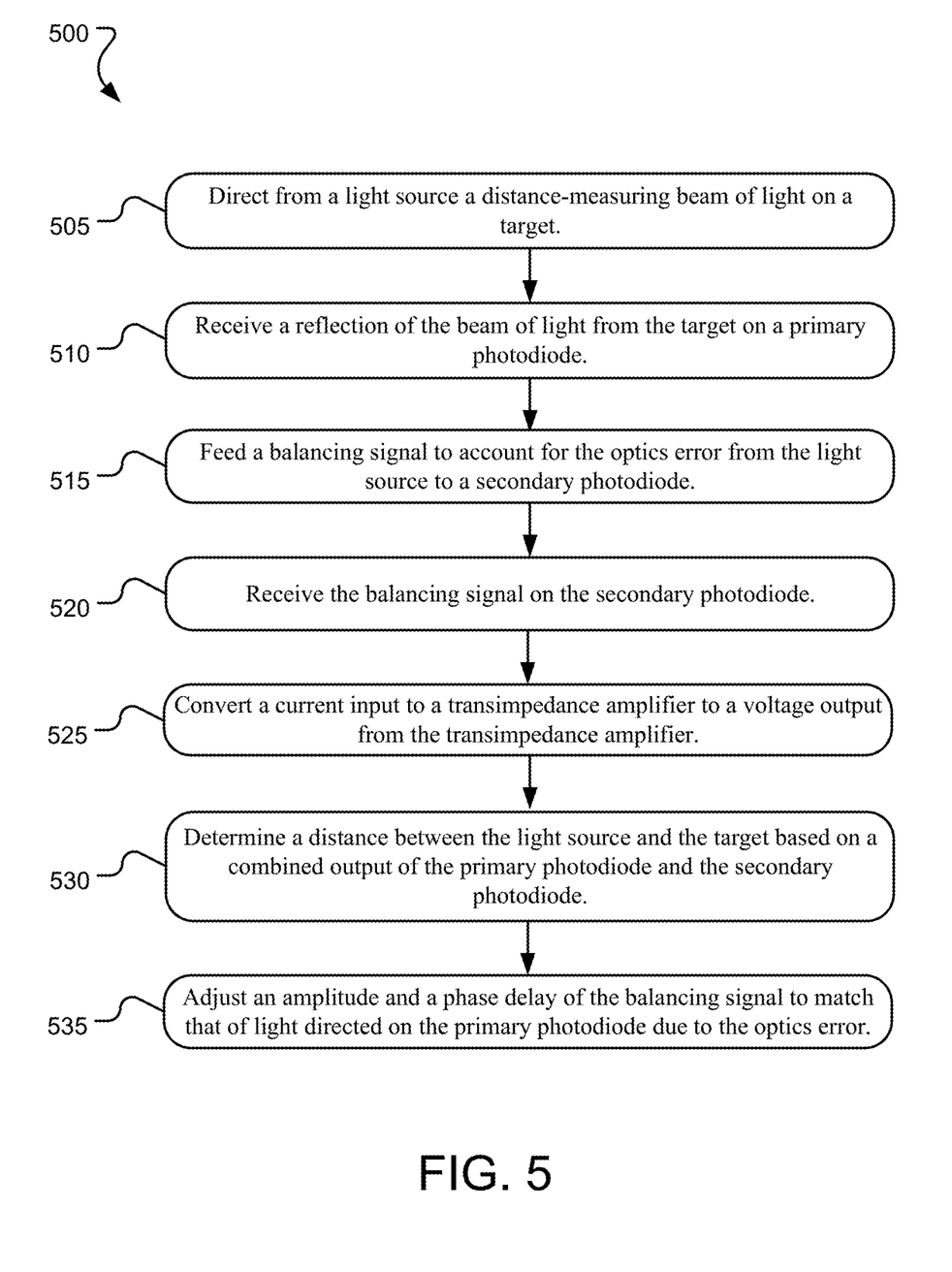
FIG. 5 illustrates example operations for operating a dual photodiode LiDAR system.

FIG. 5 illustrates example operations 500 for operating a dual photodiode Lidar system. A directing operation 505 directs from a light source a distance-measuring beam of light on a target. The directing operation 505 may direct the light through a set of emitter optics that may cause unwanted reflection or refraction within the dual photodiode Lidar system. A receiving operation 510 receives a reflection of the beam of light from the target on a primary photodiode. The receiving operation 510 may direct the light through a set of detector optics that may also cause unwanted reflection or refraction within the dual photodiode Lidar system. A portion of the unwanted reflection or refraction within the dual photodiode Lidar system may land on the primary photodiode, which causes noise and/or error in the received light signal (referred to herein as an optics error).

A feeding operation 515 feeds a balancing signal to account for the optics error from the light source to a secondary photodiode. The feeding operation 515 may utilize a dedicated path (e.g., a dedicated set of optics or a fiberoptic cable, for example). In various implementations, the dedicated path has a length chosen to yield timing equivalent to timing of the optics error. In some implementations, the feeding operation 515 is a passive operation that collects diffuse internal reflection from a front window or glass of the dual photodiode Lidar system. A receiving operation 520 receives the balancing signal on the secondary photodiode. In some implementations, the secondary photodiode may be similarly located within the dual photodiode Lidar system as the primary photodiode (thus within a similar light path for the unwanted reflection or refraction), but outside of the path of light reflected from the target. In such implementations, the feeding operation 515 may be omitted. Further, in some implementations, limited cancellation of light from the primary path may be acceptable when cancelling the light causing the balancing signal.

A converting operation 525 converts a current input to a transimpedance amplifier to a voltage output from the transimpedance amplifier. In various implementations, an output of the primary photodiode and an input to the secondary photodiode are both connected to the current input of a transimpedance amplifier at a common node. In other implementations, outputs of each of the primary photodiode and the secondary photodiode are each independently connected to separate transimpedance amplifiers. The timing circuit output(s) of the transimpedance amplifier(s) are connected to a timing circuit.

A determining operation 530 determines a distance between the light source and the target based on a combined output of the primary photodiode and the secondary photodiode from the transimpedance amplifier using the timing circuit. An adjusting operation 535 adjusts an amplitude and a phase delay of the balancing signal to match that of light directed on the primary photodiode due to the optics error. The adjusting operation 535 may be performed iteratively to achieve a desired light cancellation effect as a calibration sequence.

Figure 6:
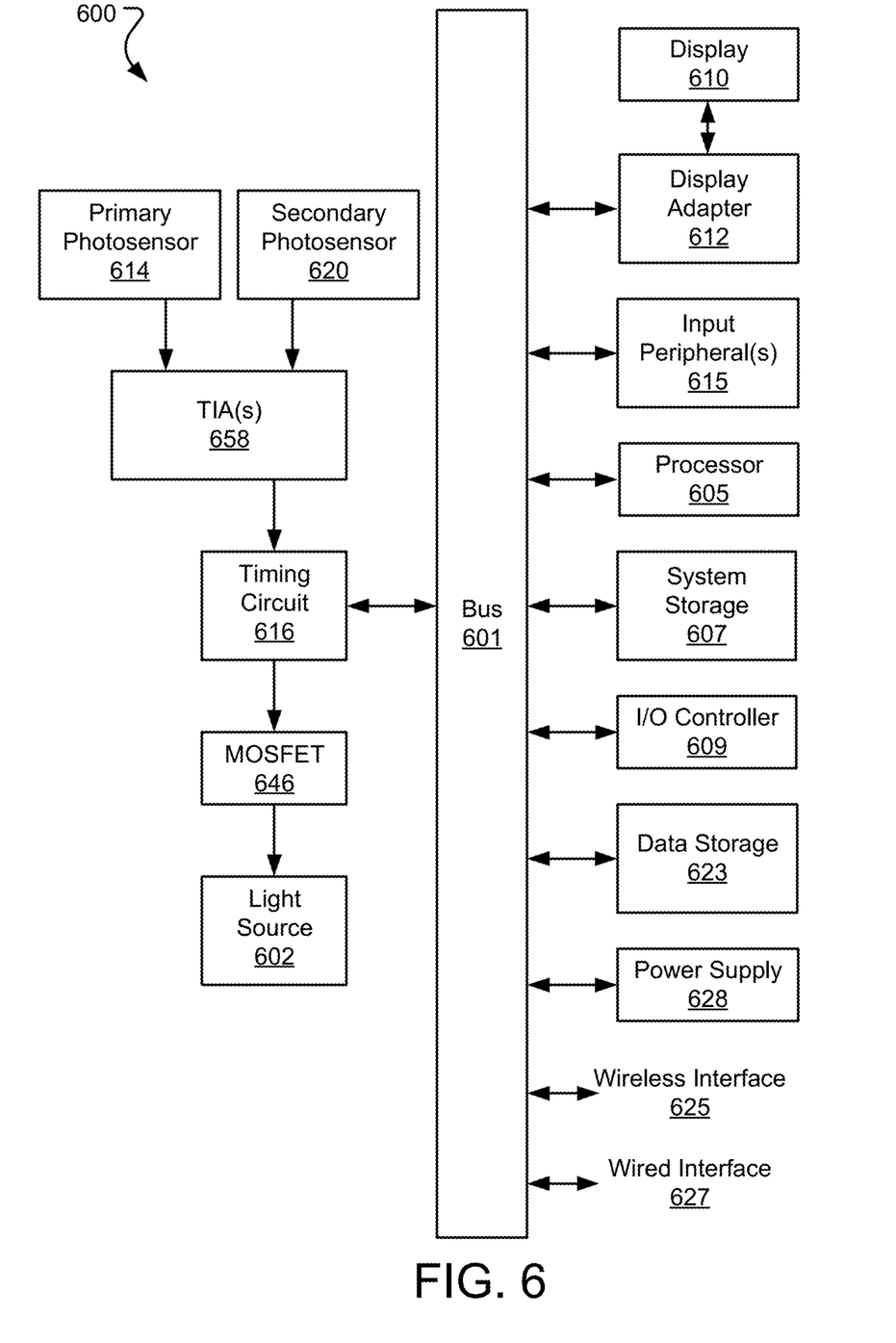
FIG. 6 illustrates an example system diagram of a computer system suitable for implementing a dual photodiode LiDAR system.

FIG. 6 illustrates an example system diagram of a computer system 600 suitable for implementing a dual photodiode LiDAR system. The dual photodiode LiDAR system includes a light source 602 driven by a MOSFET 646 that receives a signal from a timing circuit 616 to fire the light source 602 at a predetermined frequency. The light source 602 emits a beam of light at a target (not shown) and a portion of the beam of light is reflected from the target and returned to a primary photosensor 614.

Various components of emitter optics and/or detector optics may cause unwanted reflection or refraction of light emitted from the light source 602. A portion of the unwanted reflection or refraction of light may reach the primary photosensor 614, thus skewing or preventing accurate calculation of a distance to the target. A secondary photosensor 620 also receives the unwanted reflection or refraction of light in the form of a balancing signal. The balancing signal may be used to cancel the optics error created by the unwanted reflected and/or refracted light directed on the primary photosensor 614.

An output of the primary photosensor 614 is input to a transimpedance amplifier (TIA) 658 to convert and amplify the input current into a voltage useable by the timing circuit 616 to calculate a distance to the target. The input to the TIA 658 is further connected to the secondary photosensor 620, which permits a portion of the current from the primary photosensor 614 to flow through the secondary photosensor 620 rather than into the TIA 658. This proportionally reduces the input current based on the magnitude of the optics error, which may vary over time, but is assumed to similarly affect the primary photosensor 614 and the secondary photosensor 620.

The computer system 600 manages access to the timing circuit 616. The computer system 600 includes a bus 601, which interconnects major subsystems such as a processor 605, system storage 607 (such as random-access memory (RAM) and read-only memory (ROM)), an input/output (I/O) controller 609, removable storage (such as a memory card) 623, a power supply 628, and external devices such as a display screen 610 via a display adapter 612, and various input peripherals 615 (e.g., a mouse, trackpad, keyboard, touchscreen, joystick, and/or smart card acceptance device). Wireless interface 625 together with a wired network interface 627, may be used to interface to the data storage network and/or a local or wide area network (such as the Internet) using any network interface system known to those skilled in the art.

Many other devices or subsystems (not shown) may be connected in a similar manner (e.g., servers, personal computers, tablet computers, smart phones, mobile devices, etc.). Also, it is not necessary for all of the components depicted in FIG. 6 to be present to practice the presently disclosed technology. Furthermore, devices and components thereof may be interconnected in different ways from that shown in FIG. 6. Code (e.g., computer software, including mobile applications (apps) to implement the presently disclosed technology may be operably disposed in system storage 607 and/or data storage 623 (e.g., code for implementing the timing circuit 616 described in detail herein).

The computing system 600 may include a variety of tangible computer-readable storage media (e.g., the system storage 607 and the data storage 623) and intangible computer-readable communication signals. Tangible computer-readable storage can be embodied by any available media that can be accessed by the computing system 600 and includes both volatile and non-volatile storage media, as well as removable and non-removable storage media implemented in any method or technology for storage of information such as computer readable instructions, data structures, program modules, and/or other data. Tangible computer-readable storage media includes, but is not limited to, firmware, RAM, ROM, electrically erasable programmable read-only memory (EEPROM), flash memory or other memory technology, optical disc storage, magnetic cassettes, magnetic tape, magnetic disc storage or other magnetic storage devices, or any other tangible medium which can be used to store the desired information and which can be accessed by the computing system 600.

Intangible computer-readable communication signals may embody computer readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio frequency (RF), infrared (IR), and other wireless media. Computer-readable storage media as defined herein specifically excludes intangible computer-readable communications signals.

Some implementations may comprise an article of manufacture which may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The presently disclosed technology may be implemented as logical steps in one or more computer systems (e.g., as a sequence of processor-implemented steps executing in one or more computer systems and as interconnected machine or circuit modules within one or more computer systems). The implementation is a matter of choice, dependent on the performance requirements of the computer system implementing the presently disclosed technology. Accordingly, the logical operations making up implementations of the presently disclosed technology are referred to variously as operations, steps, objects, or modules. Furthermore, it should be understood that logical operations may be performed in any order, adding or replacing operations as desired, unless explicitly claimed otherwise or a specific order is inherently necessitated by the claim language.

The above specification, examples, and data provide a complete description of the structure and use of exemplary implementations of the presently disclosed technology. Since many implementations of the presently disclosed technology can be made without departing from the spirit and scope of the invention, the presently disclosed technology resides in the claims hereinafter appended. Furthermore, structural features of the different implementations may be combined in yet another implementation without departing from the recited claims.

What is claimed is:

1. A dual photodiode Lidar system comprising:
    a light source to direct a distance-measuring beam of light on a target;
    a primary photodiode to receive a reflection of the distance-measuring beam of light from the target;
    a secondary photodiode to receive a balancing signal to account for an optics error; and
    a timing circuit to determine a distance between the light source and the target based on a combined output of the primary photodiode and the secondary photodiode.

2. The dual photodiode Lidar system of claim 1, further comprising:
    a set of emitter optics to direct the distance-measuring beam of light from the light source to the target, the optics error caused by one or more of erroneous reflection and refraction from the set of emitter optics.

3. The dual photodiode Lidar system of claim 2, wherein the set of emitter optics include one or more turning mirrors, an oscillating galvo mirror, and a rotating polygonal mirror.

4. The dual photodiode Lidar system of claim 1, further comprising:
    a set of detector optics to direct the reflection of the distance-measuring beam of light from the target to the primary photodiode, the optics error caused by one or more of erroneous reflection and refraction from the set of detector optics.

5. The dual photodiode Lidar system of claim 1, further comprising:
    a transimpedance amplifier, wherein an output of the primary photodiode and an input to the secondary photodiode are both connected to the transimpedance amplifier at a common node, and wherein a resulting voltage output from the transimpedance amplifier is input to the timing circuit.

6. The dual photodiode Lidar system of claim 1, further comprising:
    a first transimpedance amplifier, wherein an output of the primary photodiode is connected to an input of the first transimpedance amplifier; and
    a second transimpedance amplifier, wherein an output of the secondary photodiode is connected to an input of the second transimpedance amplifier, wherein voltage outputs from both the first transimpedance amplifier and the second transimpedance amplifier are input to the timing circuit.

7. The dual photodiode Lidar system of claim 1, wherein the balancing signal is fed from the light source to the secondary photodiode via a dedicated path.

8. The dual photodiode Lidar system of claim 7, further comprising collecting diffuse internal reflection from a glass of the dual photodiode Lidar system.

9. The dual photodiode Lidar system of claim 1, wherein the primary photodiode and the secondary photodiode are physically separated within the system.

10. The dual photodiode Lidar system of claim 1, further comprising:
an optical barrier oriented between the primary photodiode and the secondary photodiode.

11. The dual photodiode Lidar system of claim 1, wherein the primary photodiode and the secondary photodiode are placed in close proximity and oriented facing different directions on a common die.

12. The dual photodiode Lidar system of claim 1, wherein an amplitude and a phase delay of the balancing signal is adjusted to match that of light directed on the primary photodiode due to the optics error.

13. The dual photodiode Lidar system of claim 12, wherein the amplitude and the phase delay of the balancing signal are adjusted electronically.

14. The dual photodiode Lidar system of claim 12, wherein the amplitude and the phase delay of the balancing signal are adjusted mechanically.

15. A method of operating a dual photodiode Lidar system, the method comprising:
directing from a light source a distance-measuring beam of light on a target;
receiving a reflection of the distance-measuring beam of light from the target on a primary photodiode;
receiving a balancing signal to account for an optics error on a secondary photodiode; and
determining a distance between the light source and the target based on a combined output of the primary photodiode and the secondary photodiode using a timing circuit.

16. The method of claim 15, wherein an output of the primary photodiode and an input to the secondary photodiode are both connected to a current input of a transimpedance amplifier at a common node, the method further comprising:
converting the current input to a voltage output from the transimpedance amplifier, wherein the voltage output is input to the timing circuit.

17. The method of claim 15, further comprising:
adjusting an amplitude and a phase delay of the balancing signal to match that of light directed on the primary photodiode due to the optics error.

18. The method of claim 15, further comprising:
feeding the balancing signal from the light source to the secondary photodiode via a dedicated path.

19. The method of claim 18, further comprising collecting diffuse internal reflection from a glass of the dual photodiode Lidar system wherein the dedicated path has a length chosen to yield timing equivalent to timing of the optics error.

20. A dual photodiode Lidar system comprising:
a light source to direct a distance-measuring beam of light on a target;
a primary photodiode to receive a reflection of the distance-measuring beam of light from the target;
a secondary photodiode to receive a balancing signal to account for an optics error;
a set of optics to direct the distance-measuring beam of light from the light source to the target and direct the reflection of the distance-measuring beam of light from the target, the optics error caused by one or more of erroneous reflection and refraction from the set of optics;
a transimpedance amplifier, wherein an output of the primary photodiode and an input to the secondary photodiode are both connected to a current input of the transimpedance amplifier at a common node; and
a timing circuit to determine a distance between the light source and the target based on a voltage output from the transimpedance amplifier corresponding to the current input of the transimpedance amplifier at the common node.

* * * * *